Figure 1:
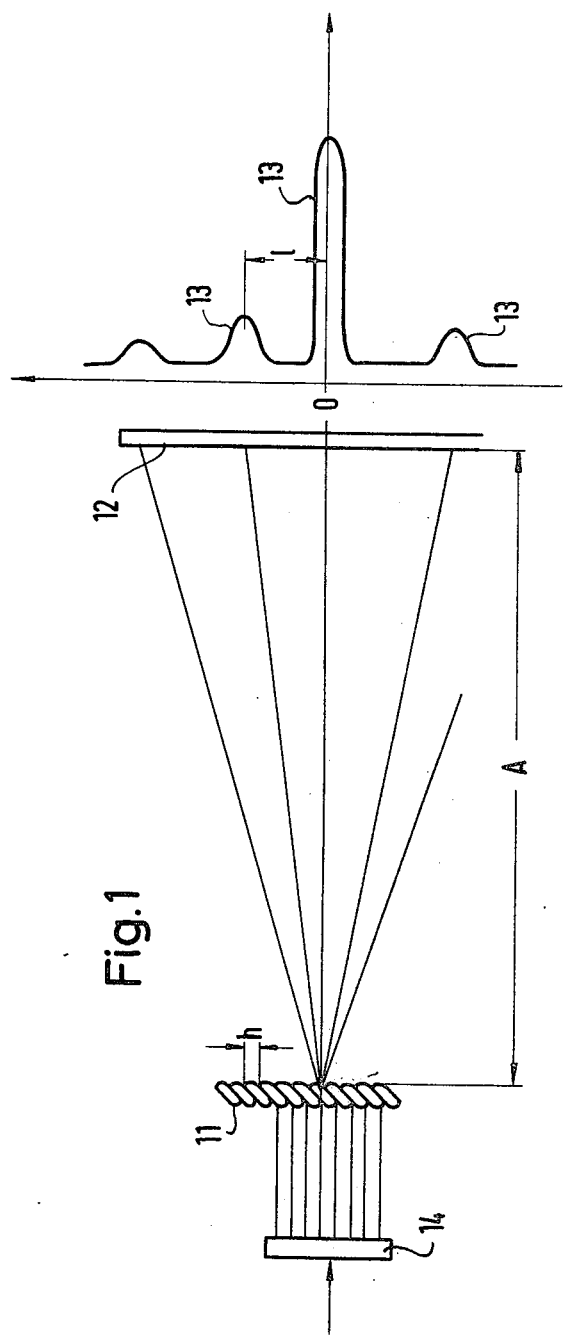

United States Patent [19]

Plöckl

[11] 4,008,964

[45] Feb. 22, 1977

[54] METHOD OF MEASURING THE PITCH OF TWISTED THREADS

[75] Inventor: Johann Plöckl, Unterhaching, Germany

[73] Assignee: Erwin Sick Optik-Elektronik, Waldkirch, Germany

[22] Filed: May 5, 1975

[21] Appl. No.: 574,254

[30] Foreign Application Priority Data

May 6, 1974    Germany .......................... 2421851

[52] U.S. Cl. ................................ 356/109; 356/111
[51] Int. Cl.² .......................................... G01B 9/02
[58] Field of Search ................ 356/109, 111, 159; 250/571

[56] References Cited

UNITED STATES PATENTS

| 3,709,610 | 1/1973 | Kruegle | 356/111 |
| 3,804,529 | 8/1974 | Hansler | 356/159 |

*Primary Examiner*—John K. Corbin
*Assistant Examiner*—Conrad Clark

[57] ABSTRACT

The pitch of twisted threads are measured by illuminating the threads with monochromatic light, especially a laser, to throw on a receiving surface a diffraction image from which the pitch is evaluated, preferably automatically by optical scanning and computing.

1 Claim, 2 Drawing Figures

METHOD OF MEASURING THE PITCH OF TWISTED THREADS

The invention relates to a method and to an apparatus for measuring the pitch of a twisted thread.

The invention seeks to provide a method and an apparatus of this kind with the aid of which the mean value of the thread pitch can be measured directly over a determined length without complicated individual measurements and calculation of mean values being necessary.

In order to solve this problem the invention proposes to illuminate the thread with monochromatic light and to evaluate the diffraction image cast on a receiving surface disposed behind the thread. According to the invention, use is thus made of the fact that a regular pattern, such as is formed for example by the recurrence of the pitch of a twisted thread, throws in monochromatic light a diffraction image whose maxima are spaced apart by a distance which, for a given wavelength of the light and a given distance between the receiving surface and the pattern, is dependent only on the grating constant, that is to say, in the present case the pitch. In this way the spacing of the diffraction maxima can be used as a measure of the thread pitch, a mean value of the pitch being always measured because the diffraction maxima are formed by a multiplicity of serially disposed turns of the thread.

It is particularly advantageous and economical for the position of the diffraction maxima to be determined automatically by optically scanning the receiving surface.

A preferred apparatus for carrying out the method of the invention is characterised in that the thread is disposed between the receiving surface and a laser supplying a monochromatic, coherent beam. The receiving surface may for example be in the form of a ground-glass screen, behind which is situated a scanning device responding to the diffraction maxima.

Figure 2:
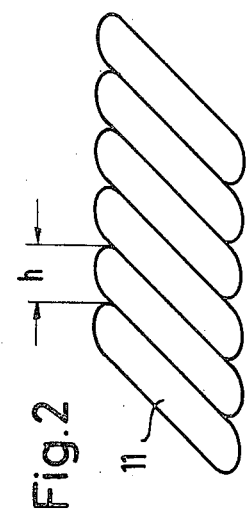

The invention is further described by way of example and with the reference to the drawings, in which:

FIG. 1 is a diagrammatical side view of an apparatus for carrying out the method of the invention, a diagram of the intensity of the diffraction image being shown on the right-hand side of the Figure; and FIG. 2 is a diagrammatical side view on a larger scale of a twisted thread suitable for measurement according to the invention.

As shown in the drawing, a twisted thread or textured yarn has a profile of the kind diagrammatically shown in FIG. 2. The dimension $h$ is here referred to as the pitch.

If a yarn 11 of this kind is now brought into the beam of a laser diagrammatically indicated at 14 in FIG. 1, there is formed on a receiving surface 12 disposed at a distance A from the yarn a diffraction image, which on the right in FIG. 1 is shown diagrammatically in its relationship to the receiving surface 12. Intensity is plotted towards the right and the distance from the centre point O is plotted in the upward direction. Diffraction maxima 13, the linear interval between which will be assumed to be $l$, are thus formed on the receiving surface 12.

Between the diffraction maxima interval $l$ and the pitch $h$ the following relationship exists:

$$l = \lambda A / h$$

and $$h = \lambda \cdot A / l,$$

where $\lambda$ is the wavelength of the laser beam.

Below is given a practical example of a measurement of the pitch $h$ by means of the apparatus of the invention:

the wavelength $\lambda = 632.8$ nm, the distance $A = 1000$ mm while the distance between the diffraction maxima will be assumed to be $l = 20$ mm.

From the above formula $h$ is thus found to be equal to 31.64 μm.

This is a mean value measured over the entire length of that part of the thread 11 covered by the laser beam.

The interval between the diffraction maxima can for example be automatically determined by scanning the receiving surface 12, while the conversion illustrated above can be made automatically in a computer, so that the final result can be immediately shown on an indicator.

The source 14 may also be the combination of a laser and a beam spreading system, which can for example consist of an optical system of the telescope type, whose eyepiece is entered by the laser beam and from whose objective the beam passes out widened by the magnification ratio of the system, for example in the ratio 1 : 4.

In a simple application the receiving surface 12 is a ground-glass screen on which is disposed, on one or both sides of the main maximum situated in the centre, a scale which, for a fixed A and $\lambda$, can be calibrated directly in units of the pitch $h$. The pitch $h$ can then be immediately read off, preferably at the point of the first lateral diffraction maximum.

I claim:

1. A method of measuring the pitch of a twisted thread having a plurality of turns, comprising: illuminating a plurality of said turns simultaneously from a direction transverse to the length of the thread with monochromatic light, receiving the diffraction image from said illuminated turns on a receiving surface disposed behind the thread, and determining the pitch of said thread from the positions of the diffraction maxima of said image.

* * * * *